(12) United States Patent
Liu et al.

(10) Patent No.: US 7,649,995 B2
(45) Date of Patent: Jan. 19, 2010

(54) METHOD AND DEVICE FOR AUTHENTICATING MS THAT HAS AN R-UIM BY USING CAVE ALGORITHM

(75) Inventors: Weimin Liu, Beijing (CN); Huajun Cao, Beijing (CN); Guang Yang, Beijing (CN)

(73) Assignees: Samsung Electronics Co., Ltd. (KR); Beijing Samsung Telecom R&D Center (CN)

( * ) Notice: Subject to any disclaimer, the term of this patent is extended or adjusted under 35 U.S.C. 154(b) by 750 days.

(21) Appl. No.: 11/068,186

(22) Filed: Feb. 28, 2005

(65) Prior Publication Data

US 2005/0221801 A1    Oct. 6, 2005

(30) Foreign Application Priority Data

Feb. 27, 2004    (CN) .................. 2004 1 0007548

(51) Int. Cl.
*H04L 12/22*    (2006.01)
*H04L 12/56*    (2006.01)

(52) U.S. Cl. ........................................ 380/247; 726/28
(58) Field of Classification Search ......... 380/247–250, 380/270; 726/3–4, 28–29
See application file for complete search history.

(56) References Cited

U.S. PATENT DOCUMENTS 6,198,823 B1 *   3/2001   Mills ........................... 380/247
6,201,871 B1 *   3/2001   Bostley et al. .............. 380/249
7,546,459 B2 *   6/2009   Robles et al. ............... 713/168
2003/0148791 A1   8/2003   Ahn et al.
2003/0236980 A1   12/2003   Hsu
2005/0228992 A1 * 10/2005   Mizikovsky ................ 713/168

FOREIGN PATENT DOCUMENTS

WO    WO 03/090433    10/2003
WO    WO 2005/032013    4/2005

OTHER PUBLICATIONS

HRPD Network Access Authentication for a Hybrid Access Terminal (HAT) with an R-UIM Used to Access Spread Spectrum Systems, 3GPP2 S.R0104-0, Oct. 21, 2004.

* cited by examiner

*Primary Examiner*—Jung Kim
*Assistant Examiner*—Venkat Perungavoor
(74) *Attorney, Agent, or Firm*—The Farrell Law Firm, LLP

(57) ABSTRACT

A method and device for authenticating a MS has an R-UIM by using CAVE Algorithm are provided. The hardware structure of the device includes a cdma2000/HRPD dual-mode chip, a User Identity Module supporting the CAVE algorithm. The dual-mode terminal forms the NAI value with the domain name stored in a memory of the dual-mode terminal in advance by the IMSI. The dual-mode terminal extracts a RAND that is necessary for the calculation of an authentication parameter1 from the Random values included in a Chap Challenge message, instructs the R-UIM card to use the CAVE algorithm to calculate the authentication parameter1 with the RAND and an existing SSD_A in the R-UIM card, and bears the authentication parameter1 by the Result domain of a Chap Response message. With the present invention, the wastes caused by the replacement of R-UIM cards can be avoided.

20 Claims, 8 Drawing Sheets

METHOD AND DEVICE FOR AUTHENTICATING MS THAT HAS AN R-UIM BY USING CAVE ALGORITHM

BACKGROUND OF THE INVENTION

1. Field of the Invention

The present invention relates to the Code Division Multiple Access 2000 (hereinafter referred to as cdma2000) and High Rate Packet Data (hereinafter referred to as HRPD) dual-mode terminals, especially to a method and device for authenticating mobile station with Removable User Identity Module (hereinafter referred to as R-UIM) by using Cellular Authentication and Voice Encryption (hereinafter referred to as CAVE) algorithm.

2. Description of the Related Art

The cdma2000 network has been widely applied commercially all over the world. In this kind of network, a Challenge Handshake Authentication Protocol (hereinafter referred to as CHAP) based on the CAVE algorithm has been adopted to verify the legitimacy of the access terminals. This authentication system has perfect methods on illegal attack-protecting. A Mobile Station's (hereinafter referred to as MS) privacy key (A-key) and the CAVE algorithm are stored in the MS and the cdma2000 network's Authentication Centre (hereinafter referred to as AuC) respectively. The authentication process mainly includes such two procedures as the update of Shared Secret Data (SSD) and the implementation of authentication. Part A of the Shared Secret Data (SSD_A) is used for access authentication. According to specific conditions, the network sends a message including a segment of random values to the MS and the AuC respectively to update the SSD_A data. After this message is received by the MS and the AuC respectively, the included random values, the A-key and other parameters are together input into the "SSD_GENEREATION PROCEDURE" to generate an SSD_A through calculation. After confirming the correctness, the old SSD_A is replaced with the new one which will be used as the key for the access authentication. When an authentication is needed to be done on a terminal, the network sends an authentication request message to the MS and the AuC, including a segment of random values. After this message is received by the MS and the AuC respectively, the authentication results are calculated in the MS and the AuC by the random values included in the message, the SSD_A and other parameters according to the CAVE algorithm. The MS sends the authentication result to the AuC. By comparing the differences between the authentication results, the MS can be authenticated to be valid or not. In cdma 2000 network's practice, the A-key can be stored in two modes. One is that it is stored in the MS, and the corresponding CAVE algorithm is also implemented in the MS and in this case, the MS has no an R-UIM. The other is that the A-key is stored in an R-UIM, and the corresponding CAVE algorithm is also implemented in the R-UIM card. In this case, the MS is called a MS has an R-UIM. High Rate Packet Data (hereinafter referred to as HRPD) network is an upgrade of cdma2000 network and has been gradually adopted in commercial application all over the world. As prescribed in the corresponding standard of the 3G Partnership Project 2 (hereinafter referred to as 3GPP2), if the access authentication is adopted by the HRPD network, the authentication mode should also be the CHAP authentication, but no detailed encryption algorithm is specified explicitly, which can be specified by the particular operator. Both HRPD network and the cdma2000 network are independent of each other, and no information exchanges between them. The subscribers can share the services through the dual-mode terminals that support both the cdma2000 network and the HRPD network, and this category of subscriber is the main cluster of HRPD network subscribers. In the following sections, except specifically pointed out, the dual-mode terminals refer to the cdma2000/HRPD ones.

At present, the operations carried out by the R-UIM card mainly includes SSD management, authentication calculation and so on. The SSD is used for the calculations of all authentication and the generation of the subsequent privacy keys. The SSD is derived from the "A-key" in the R-UIM card. When the network sends an UPDATE SSD command (which contains a RANDSSD parameter), the SSD update process starts. The network that the relevant subscriber belongs to is the unique entity to update the subscriber's SSD, as shown in FIG. 3. When the network initiates an SSD update process to a certain subscriber, the subscriber's MS firstly stores a RANDSSD parameter and then generates a random values RANDSeed. The MS transfers the RANDSeed parameter to the R-UIM card and starts to perform the Base Station Challenge function. Then, the R-UIM card generates a RANDBS parameter. The relationship between the RANDBS and the RANDSeed is prescribed by the distributor of the R-UIM card. For instance, in the R-UIM card, the RANDBS can be set to equal to the RANDSeed. The RANDBS parameter can be derived by implementing the pseudorandom process to the RANDSeed, or generated individually without respect to the RANDSeed. A Base Station Challenge command cause the R-UIM card to transmit the RANDBS parameter to the MS and in turn to the network.

In succession, the MS sends the command including the RANDSSD parameter to the R-UIM card to implement the SSD update process, as shown in FIG. 4. Then, a SSD value and a RANDBS response value AUTHBS are calculated by the R-UIM card. Here, the choices of ESN and UIMID (identity of UIM) for the calculations have been determined in advance according to corresponding indications when the R-UIM is inserted into a terminal.

In the network side, the RANDSSD parameter is used to generate a new SSD value for the selected R-UIM card. After receiving the RANDBS parameter from the MS, the network calculates the AUTHBS with the new SSD, and then sends the AUTHBS to the MS. The MS regards the received AUTHBS as the parameter of the Confirm SSD command and sends it to the R-UIM card. The R-UIM card compares the received AUTHBS with that calculated by itself, and if they are just the same, the SSD update process succeeds, then the SSD will be stored in the R-UIM card's semi-permanent memory for after coming authentication calculations. If the two AUTHBS values are different, the R-UIM discards the new SSD but remains the original one, as shown in FIG. 5.

The authentication process is the process of a terminal's legitimacy verification. Its basic operations are illustrated in FIG. 6:

The AuC sends a Chap Challenge message to an MS, including a 32-bit long random values RAND. The MS takes the RAND and the SSD_A as the inputs of the CAVE algorithm to calculate an 18-bit long authentication parameter1, then the MS sends this parameter1 to the AuC by an Authentication Challenge Response message, and the AuC compares the authentication parameter1 with the parameter2 calculated by itself with the same method. If they are just the same, the authentication passes, otherwise, the MS is rejected to access the network.

(2) The message flow of the existing HRPD network on access authentication

The HRPD network's access authentication includes the following message flow (as shown in FIG. 7):

an access network (AN) sends the Chap Challenge message to an access terminal(AT), including the random values; 701

The access terminal receives the Chap Challenge message, and then calculates the authentication parameter 1 with the received Random values. In the figure, the encryption algorithm MD5 is taken as an example to make further explanations; 702

The terminal sends a Chap Response message to the AN, including information of AT's Network Access ID (NAI), random values, the authentication parameter 1 and so on; 703

After receiving the Chap Response message from the AT, the AN sends a Radius Access Request message to AN-AAA, including the three parameters included in the Chap Response message; 704

The AN-AAA regards the Random values and the local Password (AN-AAA Password and the AT's Password are just the same) as input value to calculate the authentication parameter 2 using the MD5 algorithm; 705

The AN-AAA compares the authentication parameter 1 with the authentication parameter 2; 706

If they are equal to, it sends a Radius Access Accept message to the AN, indicating that the authentication passes the; 707

If the authentication parameter 1 is not the same as the authentication parameter 2, the AN-AAA sends a Radius Access Reject message to the AN to reject the access of the terminal; 708

After receiving the Radius Access Accept message, the AN sends a Chap Success message to the terminal, indicating that the authentication process is successful; 709

And after receiving the Radius Access Reject message, the AN sends the Chap Failure message to AT, indicating that the authentication process failure. 710

In practice, the voice service is normally provided by means of the cdma2000 network and the high rate data service is normally provided by means of the HRPD network. Therefore, the dual-mode terminals that support not only the cdma2000 network but also the HRPD network will take up a sizable share. Because the cdma2000 network is generally established ahead of the HRPD network, some subscribers of the HRPD network are upgraded from that of the cdma2000 network.

The existing R-UIM cards only support the CAVE algorithm. For a cdma2000/HRPD dual-mode terminals has an R-UIM, the R-UIM card is the unique identifier of subscriber's legitimacy. Therefore, as the cdma2000 network has been launched into operation and holds a lot of subscribers, how to realize the HRDP network's access authentication by reusing the existing R-UIM cards' cdma2000/HRPD dual-mode terminal is a challenge to the HRPD network construction.

SUMMARY OF THE INVENTION

An object of the present invention is to provide a cdma2000/HRPD dual-mode terminal has an R-UIM card. The terminal can reuse the existing cdma2000 R-UIM cards, i.e., the CAVE algorithm can be used for the terminals' HRPD network access authentication.

To achieve the object mentioned above, a cdma2000/HRPD dual-mode terminal using CAVE as access authentication algorithm comprising:

a hardware structure including: an antenna, a radio module, a cdma2000/HRPD dual-mode chip, a User Identity Module supporting the CAVE algorithm, a memory, a Liquid Crystal Display, a keyboard and a battery module, and the dual-mode terminal forming a NAI value IMSI@domain name as a such way that a IMSI is stored in the R-UIM card, and the domain name is stored in the memory of the dual-mode terminal in advance:

the dual-mode terminal extracting a RAND that is necessary for the calculation of the authentication parameter1 from a Random values included in a Chap Challenge message;

the dual-mode terminal instructing the R-UIM card to use the CAVE algorithm to calculate the authentication parameter1 with the random values RAND and an exsiting SSD_A in the R-UIM card;

the dual-mode terminal bearing the authentication parameter1 by a Result domain of a Chap Response message; and The present invention is adapted to address the problem that no cdma2000/HRPD dual-mode terminal has an UIM is in service by far or none of the existing R-UIM cards can continue to work well after the cdma2000 network is upgraded to the cdma2000/HRPD network. With the present invention, the convenience brought by the terminals that the R-UIM card is separatable from the MS can still be shared by the subscribers, and the wastes caused by the replacement of R-UIM cards can be avoided.

DETAILED DESCRIPTION OF THE PREFERRED EMBODIMENTS

Figure 1:
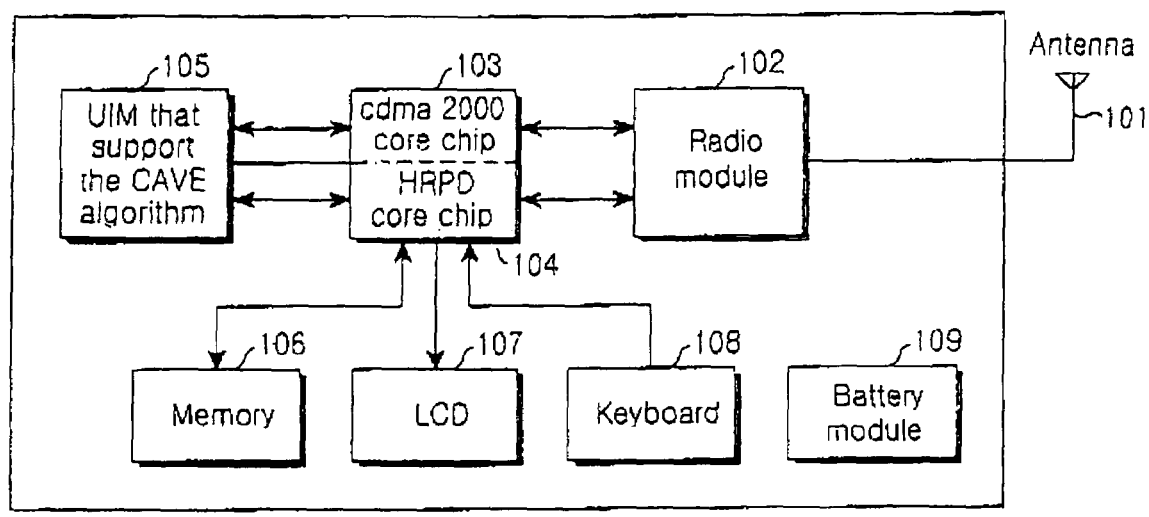
FIG. 1 shows a hardware structure of the cdma2000/HRPD dual-mode terminal that utilizes the CAVE as the access authentication algorithm.

The main object of the present invention is to realize the cdma2000/HRPD dual-mode terminal with the features that the R-UIM card is separatable from the MS and no modification is needed to be done to the HPRD network authentication flow but to use the R-UIM cards have been used in the cdma2000 network continuously. In general, with the present solution, marked benefits will be gained at very little cost.

The present invention is based on the following facts: by far, the cdma2000/HRPD dual-mode terminals has an R-UIM are starved for on sale, but there is no dual-mode R-UIM card that supports both the two networks' authentication simultaneously. Even if the dual-mode R-UIM card that supports the two networks' authentication simultaneously comes into being in the future, tremendous wastes will be caused by replacing the large amount of R-UIM cards served in the existing cdma2000 network.

The main idea of the present invention is to realize the dual-mode terminals has an R-UIM can support the two networks' access authentication, and the existing R-UIM cards can still be in service, by processing the parameters carried by the message flow of the HRPD network and in virtue of the SSD update result of the cdma2000 network. Thus, the problems above can be well settled.

To enable the dual-mode terminal to bear the characteristics of supporting the mode that the R-UIM card is separatable from the MS, reusing the existing R-UIM cards and supporting both the two networks' access authentication, the following basic functions should be implemented by each part of the dual-mode terminal:

Antenna 101

It is used for receiving and transmitting radio signals.

Radio Module 102

It takes charge of the tasks such as the conversion between baseband digital signals and RF analog signals, the transmission and receiving of the RF analog signals, etc.

cdma2000 Core Chip 103

It is the master processing unit with the functions including the cdma2000 service data's coding and decoding, the physical channels' spectrum spreading and de-spreading, modulating and demodulating. In addition, the dual-mode chip implements tasks such as provision of a run platform for the software in the application layer of the terminal, bearing the application software modules, transmitting, receiving and processing on-the-air interface signaling, controlling a paging process and so on. It controls every relevant module in the terminal so as to make them work cooperatively.

HRPD Core Chip 104

In practice, it shares the same entity with the cdma2000 core chip physically, but it performs the function of HRPD network's processing of data and signaling. The software modules that bears correspond to the HRPD network. At a certain time, only one of them (the cdma2000 core chip and the HRPD core chip) is in the operating state.

Interface Module

The interface module bridges the cdma2000/HRPD dual-mode chip with the R-UIM. It can be either built in the dual-mode chip or designed outside but interlinked with dual-mode chip. This module is not shown in the figures.

R-UIM that Supports the CAVE Algorithm 105

The R-UIM is used for storing the user's identity information and other network parameters, etc. It supports the authentication based on the CAVE algorithm and complys with the China Communication Industry Standard YD/T1168—2001—"Technical specifications on the User Identity Module (UIM) of the 800 MHz cdma digital cellular mobile communication network" or the 3GPP2 C.S0023-1 "Removable User Identity Module (R-UIM) for cdma2000 Spread Spectrum Systems Addendum1" protocol.

Memory 106

It is data memory module in the terminal and stores the data necessary to the terminal's normal operation.

LCD 107

Information display unit

Keyboard 108

It is used for information input. Together with the LCD, it completes the interface function that the user interacts with the terminal.

Battery Module 109

Provides every module with power supply.

In addition, such units as a microphone, a headphone and so on should be served for the terminal.

During a normal voice call process, the user sends instructions to the cdma2000 core chip (103) or the HRPD core chip (104) through the man-machine interface made up of the keyboard (108) and the LCD (107) to initiate a call. After receiving the user's instructions, the core chip constructs a signalling message with the help of the CAVE-supported R-UIM (105) and the memory module (106) to complete the establishment of the call cooperatively with the network and notifies the user via the LCD (107). Then, the user can start the phone call and it's voice is sent to the core chip through the microphone and coded and modulated here. Then it is transmitted to the network. Meanwhile, the core chip demodulates and decodes the received radio channel frames and sends them to the headphone. During this process, as the core chip's peripherals, the radio module (102), the memory module (106) and the battery module (109) provide necessary support to the core chip.

As for the authentication process based on the CAVE algorithm, following main modules are involved: the cdma2000/HRPD dual-mode chip (103, 104) and the R-UIM (105) that supports the CAVE algorithm. The core chip decodes the received authentication message and transfers the necessary parameters to R-UIM (105) to the process. After R-UIM (105) receiving the authentication parameters transferred from the core chip, it carries out the calculation based on CAVE algorithm with the stored authentication information and then returns the calculation result to the core chip. After receiving the calculation result from R-UIM (105), the core chip constructs the corresponding message according to the result and transmits it to the cellular network. During this process, the support from the Radio module (102), the memory (106) and the battery module (109) is also necessary for the core chip.

Figure 8:
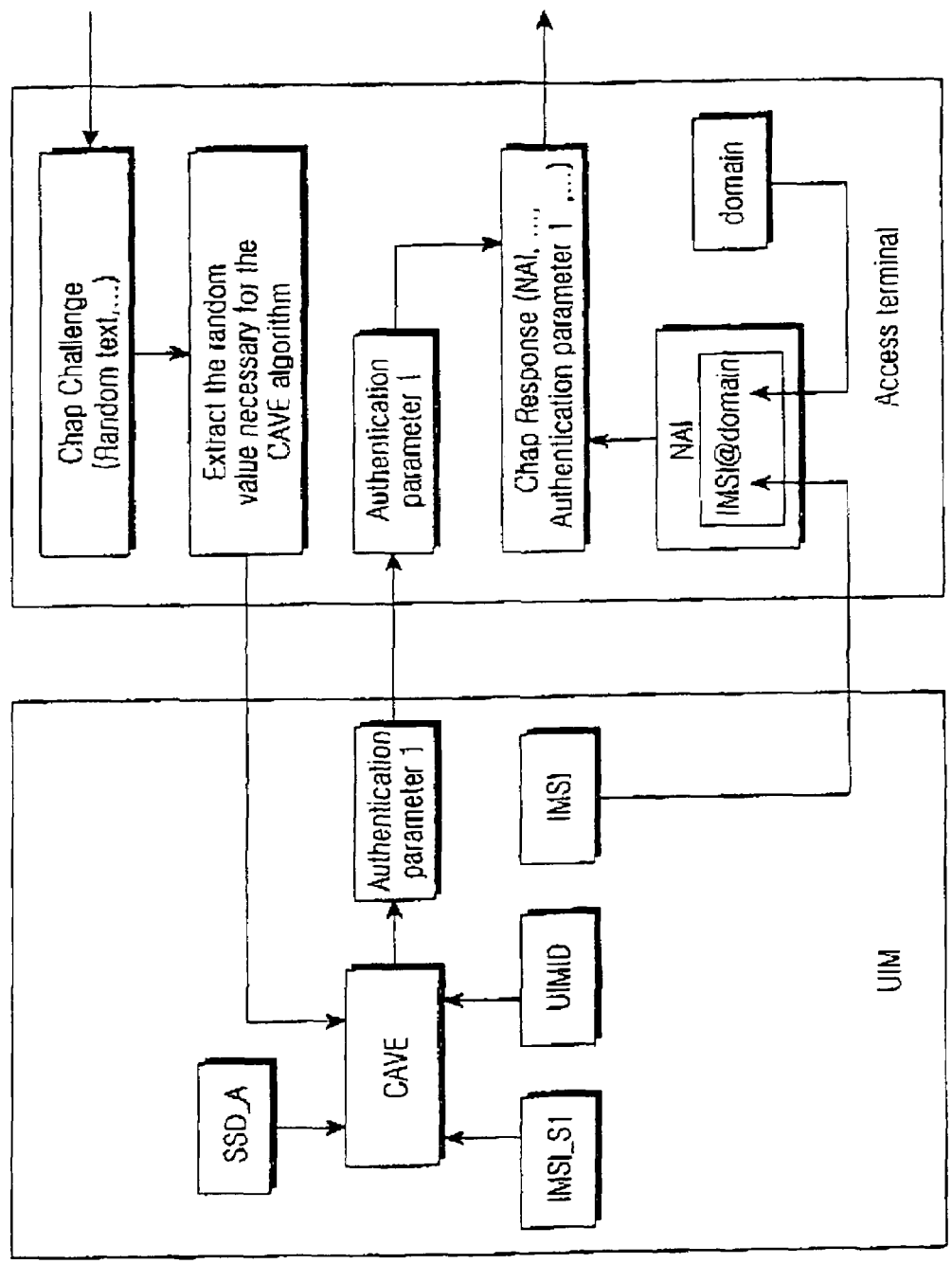
FIG. 8 shows an implementation of the authentication of the dual-mode terminal according to the present invention in the HRPD network.

To support the HRPD network authentication, following new functions should be performed by the dual-mode terminal (as shown in FIG. 8):

1. Utilization of the Chap Challenge Message

The Chap Challenge message is sent from the AN to the Access terminals, carrying the random value. Having been processed, this random values can be used necessary to the CAVE algorithm. The Random values is a character string presented by octets. It is necessary to convert the octets groups into binary format and extract the random values necessary to the CAVE authentication. As for the random values required for the CAVE authentication, consistency must be kept between the access terminals and the AN-AAA. The operation of generating the random values necessary to the CAVE authentication is implemented inside the core chip. In practice, the access terminal receives the signal through antenna from the network and transfers it to the radio module. The radio module processes the signal, i.e., completes the conversion between the baseband digital signal and the RF analog signal, etc., and transfers the processed signal to the master processing chip. The master processing chip identifies and processes the Chap Challenge message. The functions of the antenna part and the radio module are not illustrated in the corresponding figure.

2. Instruct the R-UIM to Carry Out the Authentication Calculation.

Upon inputting the random values that is obtained through the steps above and is necessary to the CAVE authentication into the UIM, the core chip calls the "Run CAVE" command to instruct the R-UIM to carry out the authentication calculation.

3. The Authentication Calculation Performed by the UIM

Regarding the random values transferred from the core chip, the UIMID stored in the R-UIM card, the IMSI_S1 (part of the IMSI) and the SSD_A as input parameters, the R-UIM implements the authentication calculation and generates the authentication result parameter1.

4. R-UIM Card Outputting the Authentication Result

The core chip uses a Get RESPONSE command to instruct the R-UIM card to output the authentication parameter1.

5. Construction of the NAI Value

NAI value is the username used in the HRPD network. None of the current R-UIM cards supports the storage of NAI value.

To provide the NAI values necessary to the HRPD network, the dual-mode terminals should operate as follows:

a. Storing the domain name information in the memory module b. The master processing module reads the IMSI from the R-UIM card and reads the domain name information from the memory module.

c. The master processing module constructs the NAI value can be in the following format: IMSI@domain name, and applies the NAI value to corresponding processing.

6. Generation of the Chap Response Message

The Chap Response message is the response of the access terminal to the Chap Challenge message from the AN. The core chip constructs the Chap Response message with the NAI (which is obtained through the approach described above) and the authentication parameters. The other parameters are filled in the Chap Response message according to the specifications of IETF RFC1994, PPP Challenge Handshake Authentication Protocol (CHAP), August 1996.

7. Transmission of the Chap Response Message

The core chip transmits the Chap Response message to the network through the radio module and the antenna. The functions of the antenna and the radio module parts are not illustrated in the corresponding figure.

Figure 2:
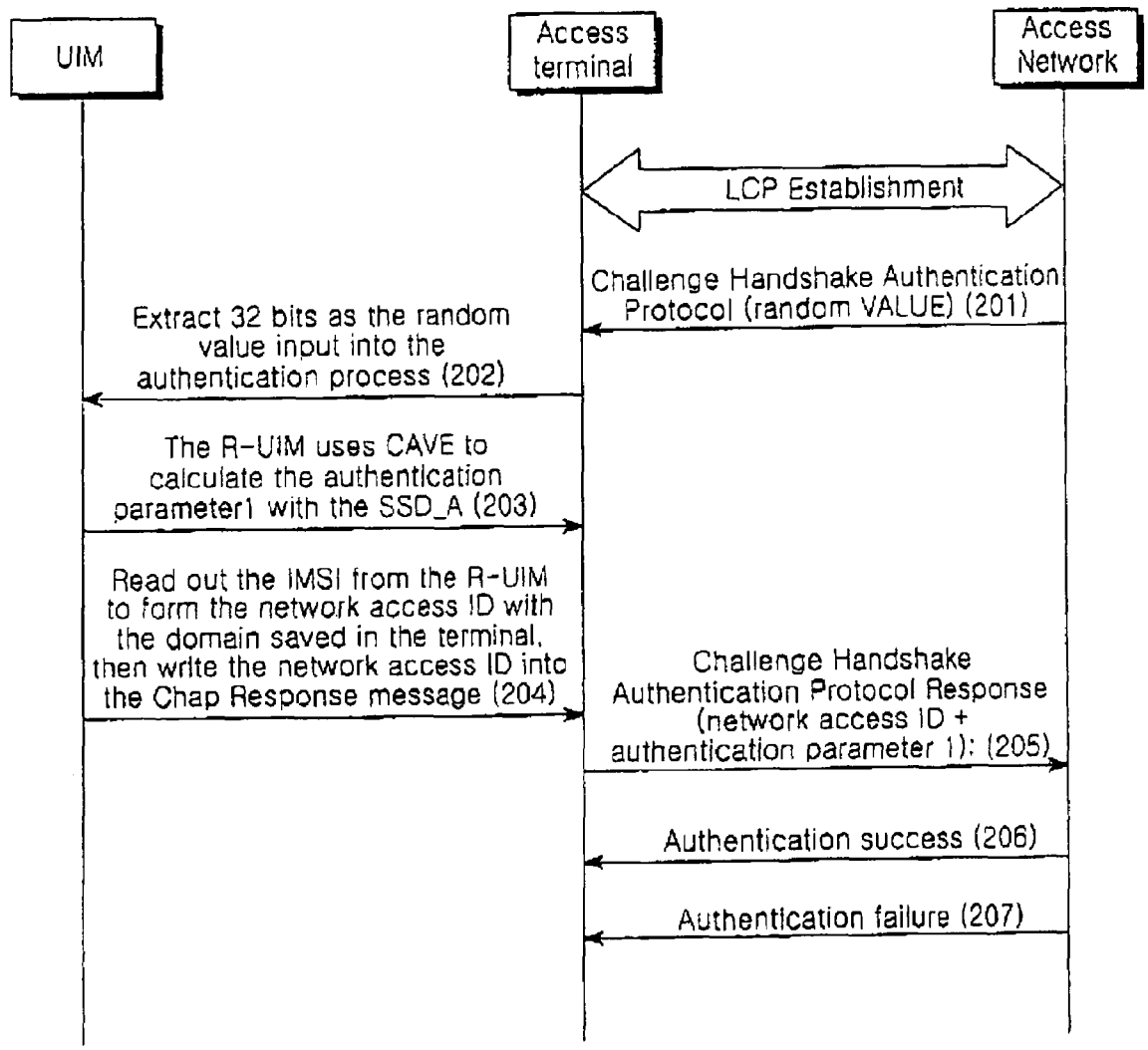
FIG. 2 illustrates a flow chart of authentication in the HRPD network performed by the dual-mode terminal according to the present invention.
Figure 3:
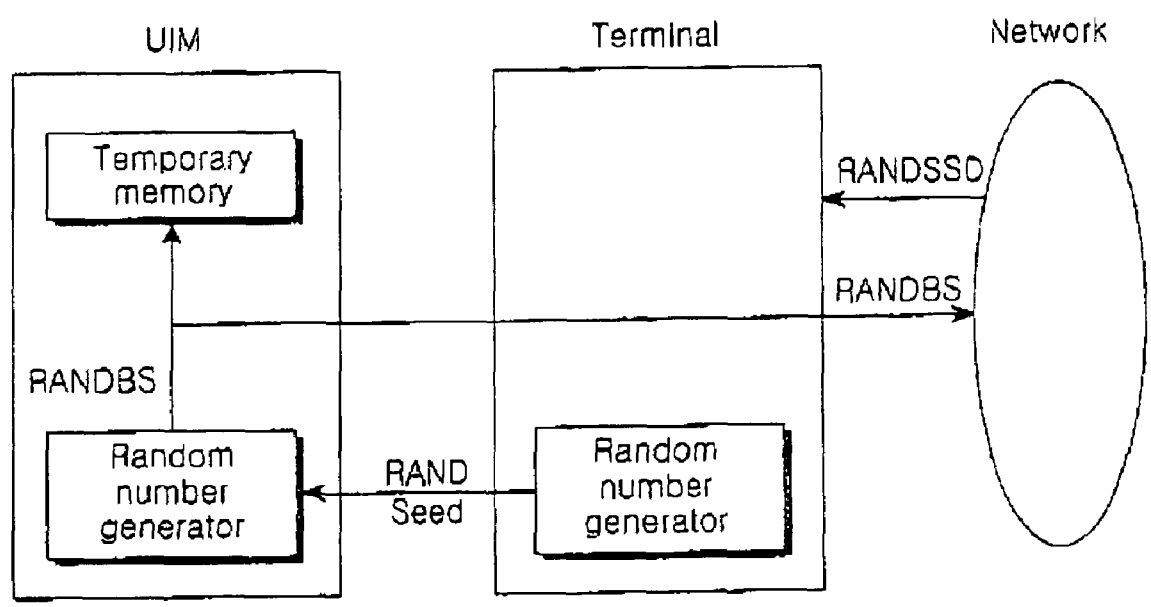
FIG. 3 shows the base station challenge operation.
Figure 4:
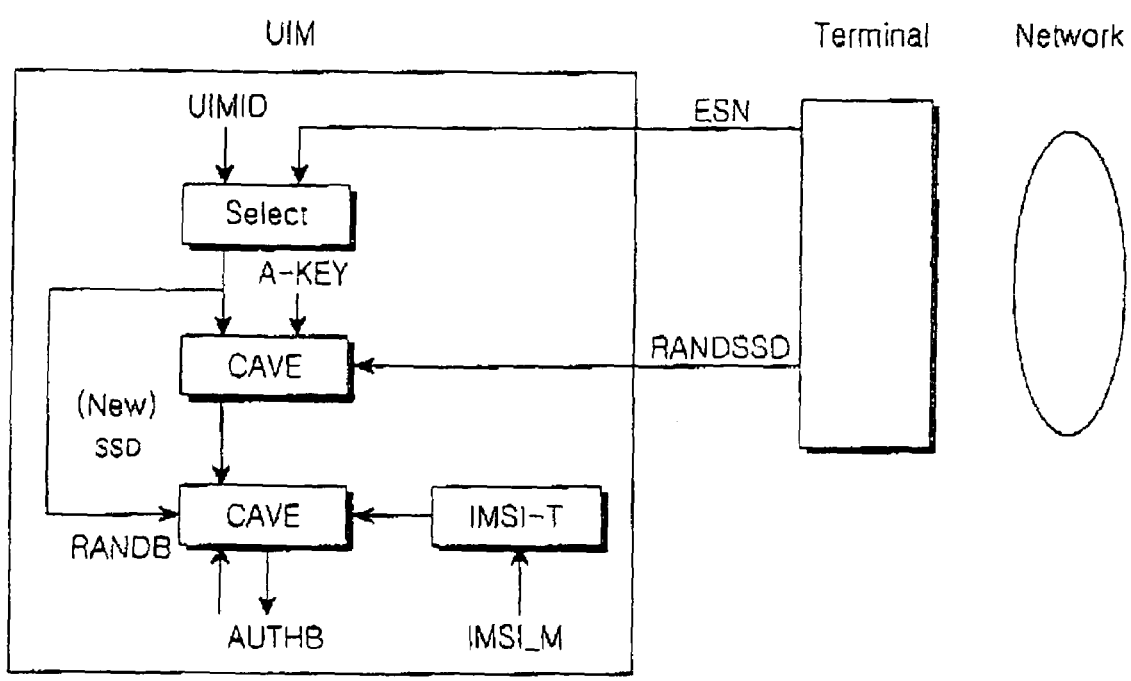
FIG. 4 illustrates a SSD update process and a calculation of AuthBS.
Figure 5:
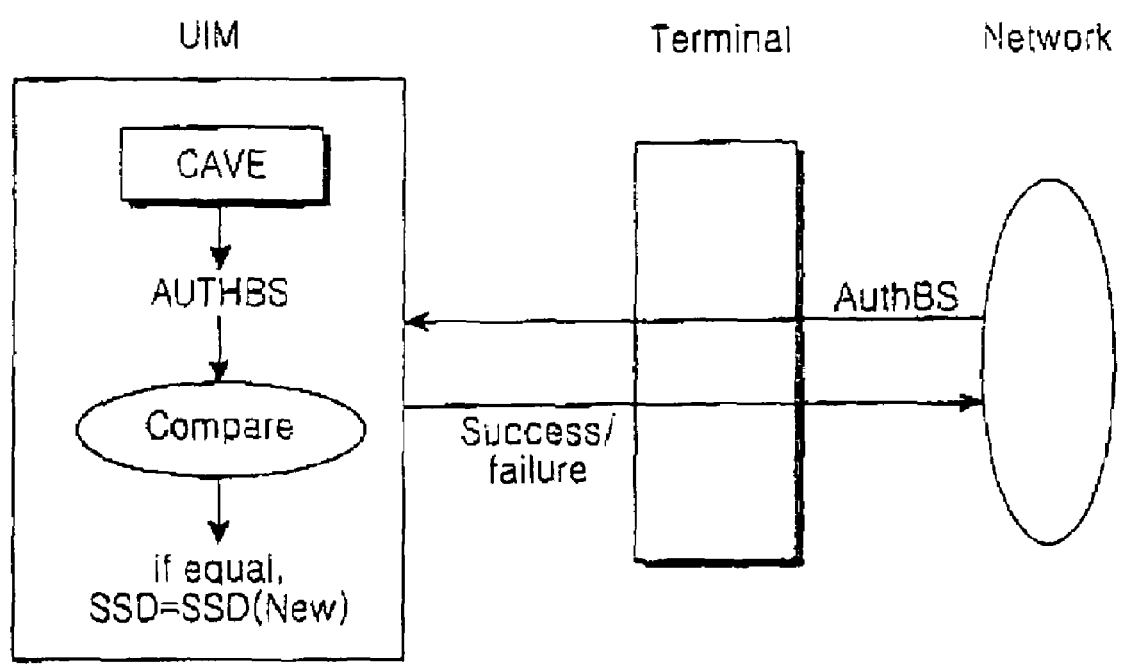
FIG. 5 shows a SSD confirmation operation.
Figure 6:
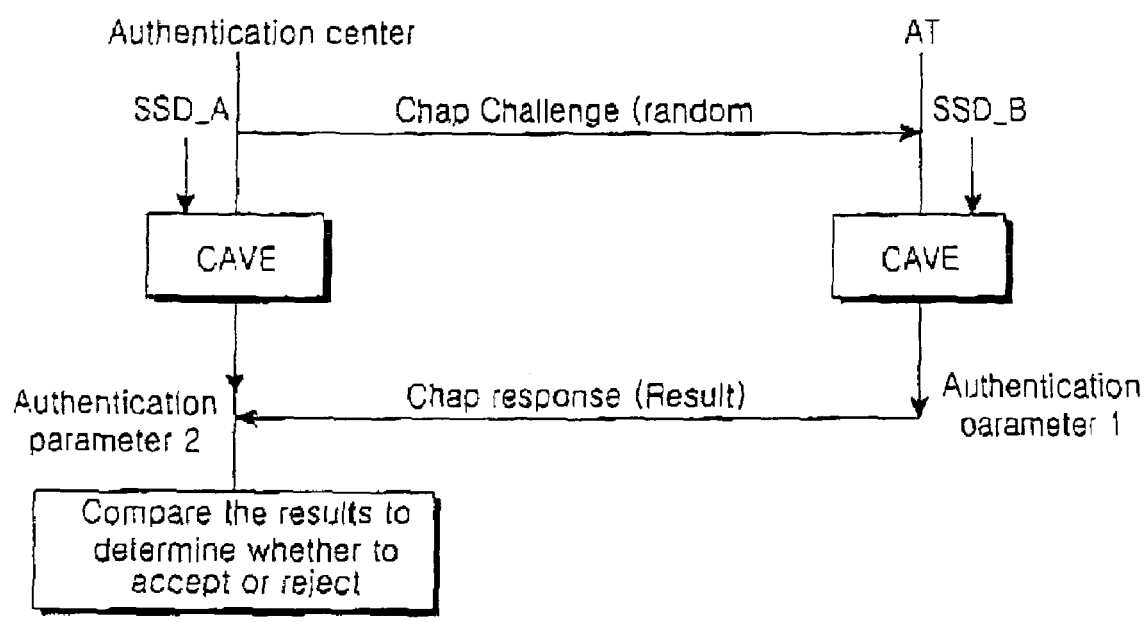
FIG. 6 illustrates a CAVE authentication process.
Figure 7:
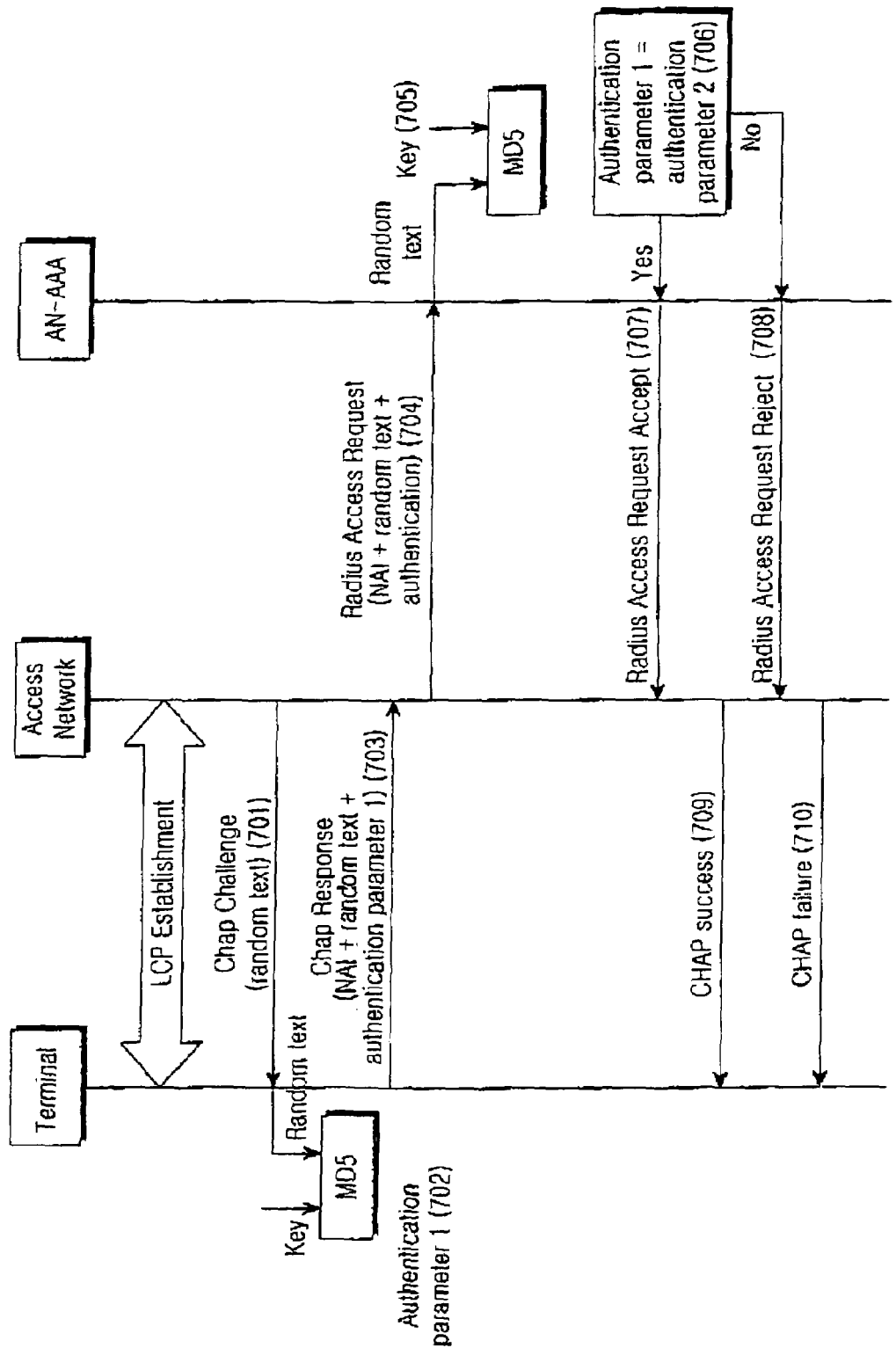
FIG. 7 shows an access authentication message flow that 3GPP2 defines for the HRPD network.

FIG. 2 illustrates the flow chart of the authentication in the HRPD network performed by the access terminal according to the present invention, and the steps will be explained in more detail.

In step 201, the access network sends the Chap Challenge message, i.e., the Challenge Handshake Authentication Protocol Challenge message to the access terminal, including the "Random values.

In step 202, the access terminal extracts 32 bits from the Random values as a random values RAND for the authentication process and sends it to the UIM.

In step 203, the UIM calculates the authentication parameter 1 through the CAVE algorithm with the SSD_A, the RAND and other parameters and sends the authentication parameter 1 to the access terminal.

In step 204, the access terminal reads out the IMSI from the R-UIM card and constructs the NAI value together with domain name stored in advance.

The access terminal writes the constructed NAI and authentication parameter 1 into the Chap Response message, i.e., the Challenge Handshake Authentication Protocol Response message, then transmits this Chap Response message to the access network in step 205.

In step 206, if the authentication is successful, the access network send an Authentication Success message to the access terminal.

And if the authentication fails, the access network will send an Authentication Failure message to the access terminal in step 207.

While the present invention has been shown and described with reference to certain embodiments thereof, it should be understood by those skilled in the art that various changes in form and details may be made therein without departing from the spirit and scope of the invention as defined by the appended claims.

What is claimed is:

1. A method for authenticating an access terminal having an R-UIM (Removable User Identity Module) card by using a CAVE (Cellular Authentication and Voice Encryption) algorithm, the method comprising steps of:

extracting a RAND (random number) that is necessary for calculation of an authentication parameter from random values included in a CHAP (Challenge Handshake Authentication Protocol) Challenge message transmitted by an access network;

instructing the R-UIM card to use the CAVE algorithm to calculate an authentication parameter with the RAND;

placing the authentication parameter and identification of the access terminal in a CHAP Response message to be transmitted to the access network in response to the CHAP Challenge message, wherein the access terminal is a dual mode access terminal which is able to access heterogeneous communication systems respectively, and wherein the R-UIM card is commonly used for authenticating the access terminal in each of the heterogeneous communication systems.

2. The method according to claim 1, wherein a core chip of hardware structure is a cdma 2000/HRPD (Code Division Multiple Access 2000/High Rate Packet Data) dual-mode chip.

3. The method according to claim 1, wherein the R-UIM card hardware structure is a single-mode card that only supports the CAVE authentication algorithm.

4. The method according to claim 1, wherein the R-UIM card is separatable from the access terminal.

5. The method according to claim 1, wherein the authentication parameter is calculated using the RAND and an existing $SSD_{13}$ A (Secret Service Data Part A) in the R-UIM card, and the SSD_A necessary for the CAVE algorithm in the R-UIM card comes from a cdma2000 (Code Division Multiple Access 2000) network.

6. The method according to claim 1, wherein the identification is NAI (Network Access ID).

7. The method according to claim 6, wherein the NAI comprises an IMSI (International Mobile Subscriber Identity) stored in the R-UIM card and a domain name stored in the access terminal in advance.

8. The method according to claim 6, wherein the NAI comprises an IMSI (International Mobile Subscriber Identity) and a domain name stored in the access terminal.

9. The method according to claim 1, wherein the instructing step further comprises:

executing a "RUN CAVE" function.

10. The method according to claim 1, wherein the placing step further comprises:

executing a "GET RESPONSE" function.

11. A cdma 2000/HRPD (Code Division Multiple Access 2000/High Rate Packet Data) dual-mode terminal which is able to access a cdma 2000 network and an HRPD network, respectively, the terminal comprising:

an antenna for receiving and transmitting radio signals;

an RF (Radio Frequency) module for receiving radio signals and converting radio signals into baseband signals;

a cdma 2000/HRPD core chip connected to the RF module for receiving a CHAP (Challenge Handshake Authentication Protocol) Challenge message including Random values from the HRPD network and placing an authentication parameter and an identification used in the HPRD network in a CHAP Response message to be transmitted to the HPRD network in response to the CHAP Challenge message;

an R-UIM (Removable User Identity Module) card for supporting a CAVE (Cellular Authentication Voice Encryption) algorithm for outputting the authentication parameter by the Random values; and a display connected to a cdma 2000/HRPD dual-mode modem for displaying messages received from the HRPD network, wherein the R-UIM card is commonly used for authenticating the cdma 2000/HRPD dual-mode access terminal in both the cdma 2000 network and the HRPD network.

12. The device according to claim 11, wherein the cdma 2000/HRPD core chip integrally comprises a cdma 200 core chip and an HRPD core chip, performs a function of the HRPD network's processing of data and signaling, software modules borne by the HRPD core chip correspond to the HRPD network, at a certain time, only one of the cdma 2000 core chip and the HRPD core chip is in an operating state, and the cdma 2000/HRPD core chip's functions comprise those of software stored on the core chip except one of service data's coding and decoding, and physical channels modulating and demodulating.

13. The device according to claim 11, wherein the R-UIM that supports the CAVE algorithm stores user's identity information and other network parameters.

14. The device according to claim 11, wherein the antenna receives a signal from a network and transfers the signal to the RF module, then the RF module processes the signal and transfers the processed signal to the core chip, the core chip identifies and processes a CHAP (Challenge Handshake Authentication Protocol) Challenge message, and generates random values necessary to a CAVE (Cellular Authentication and Voice Encryption) authentication with Random values carried by the CHAP Challenge message.

15. The device according to claim 11, wherein the core chip inputs the random values necessary to the CAVE authentication to the R-UIM and instructs the R-UIM to implement a "Run CAVE" operation.

16. The device according to claim 11, wherein the R-UIM card regards the random values transferred from the core chip, a UIMID (User Identity Module Identifier) stored in the R-UIM card, an IMSI_S1 (International Mobile Subscriber Identity Part S1) that is part of an IMSI, and an SSD_A (Secret Service Data Part A) as input parameters to implement an authentication calculation and generates the authentication parameter.

17. The device according to claim 11, wherein the core chip uses a Get RESPONSE command to instruct the R-UIM card to output the authentication parameter.

18. The device according to claim 11, wherein the core chip reads an IMSI (International Mobile Subscriber Identity) from the R-UIM card and reads domain name information from a memory module and constructs an NAI (Network Access ID) value in a format of IMSI@domain name.

19. The device according to claim 11, wherein the core chip constructs a Chap CHAP (Challenge Handshake Authentication Protocol) Response message with an NAI (Network Access ID) and the authentication parameter which has been written into a Result domain, and other parameters are filled in the CHAP Response message.

20. An access terminal apparatus, included in an access terminal, for authenticating the access terminal having a reusable R-UIM (Removable User Identity Module) by using a CAVE (Cellular Authentication Voice Encryption) algorithm, the access terminal apparatus comprising;

means for extracting a RAND (random number) that is necessary for calculation of an authentication parameter from random values included in a CHAP (Challenge Handshake Authentication Protocol) Challenge message received from an access network;

means for instructing the R-UIM card to use the CAVE algorithm to calculate an authentication parameter with the RAND and an existing SSD_A (Secret Service Data Part A) in the R-UIM card;

means for placing the authentication parameter and identification of the access terminal in a CHAP Response message to be transmitted to the access network in response to the CHAP Challenge message, wherein the access terminal is a dual mode access terminal which is able to access heterogeneous communication systems, and wherein the R-UIM card is commonly used for authenticating the access terminal in each of the heterogeneous communication systems.

* * * * *